(12) United States Patent
Sathyanarayana

(10) Patent No.: US 7,778,450 B2
(45) Date of Patent: Aug. 17, 2010

(54) PATTERN RECOGNITION SYSTEMS AND METHODS

(75) Inventor: Shashidhar Sathyanarayana, Union City, CA (US)

(73) Assignee: Scimed Life Systems, Inc., Maple Grove, MN (US)

( * ) Notice: Subject to any disclaimer, the term of this patent is extended or adjusted under 35 U.S.C. 154(b) by 903 days.

(21) Appl. No.: 11/041,130

(22) Filed: Jan. 20, 2005

(65) Prior Publication Data
US 2006/0159319 A1 Jul. 20, 2006

(51) Int. Cl.
*G06K 9/00* (2006.01)
(52) U.S. Cl. .................. 382/128; 382/165; 382/170; 382/173
(58) Field of Classification Search ............ 382/128, 382/255, 132, 131, 130, 165, 170, 173, 129
See application file for complete search history.

(56) References Cited

U.S. PATENT DOCUMENTS

| | | | | |
|---|---|---|---|---|
| 4,707,786 A | * | 11/1987 | Dehner | 382/131 |
| 4,947,323 A | * | 8/1990 | Smith | 382/132 |
| 4,975,970 A | | 12/1990 | Zettel et al. | |
| 5,012,504 A | | 4/1991 | McFaul et al. | |
| 5,321,501 A | | 6/1994 | Swanson et al. | |
| 5,331,964 A | | 7/1994 | Trahey et al. | |
| 5,339,815 A | * | 8/1994 | Liu et al. | 382/110 |
| 5,528,302 A | | 6/1996 | Basoglu et al. | |
| 5,532,490 A | * | 7/1996 | Gullberg et al. | 382/131 |
| 5,574,764 A | | 11/1996 | Granfors et al. | |
| 5,757,951 A | * | 5/1998 | Tuy | 382/131 |
| 5,793,883 A | | 8/1998 | Kim et al. | |
| 5,862,269 A | * | 1/1999 | Cohen et al. | 382/304 |
| 5,905,809 A | * | 5/1999 | Timmer | 382/131 |
| 6,216,540 B1 | * | 4/2001 | Nelson et al. | 73/633 |
| 6,245,016 B1 | * | 6/2001 | Daft et al. | 600/443 |
| 6,333,993 B1 | * | 12/2001 | Sakamoto | 382/173 |
| 6,346,079 B1 | | 2/2002 | Haider et al. | |
| 6,366,638 B1 | * | 4/2002 | Hsieh et al. | 382/132 |

(Continued)

FOREIGN PATENT DOCUMENTS

EP 353299 A1 * 2/1990

(Continued)

OTHER PUBLICATIONS

Torfinn Taxt, "Restoration of Medical Ultrasound Images Using Two-Dimensional Homomorphic Deconvolution", Jul. 1995, IEEE Transactions on Ultrasonics, Ferroelectrics, and Frequency Control, vol. 42, No. 4 pp. 543-554.*

(Continued)

*Primary Examiner*—Aaron W Carter
(74) *Attorney, Agent, or Firm*—Frommer Lawrence & Haug LLP; Bruce E. Black

(57) ABSTRACT

The invention is generally directed to imaging systems, and more particularly to systems and methods for pattern recognition. In one embodiment, a medical imaging system includes an imaging device and a computer-usable medium, electrically coupled to the imaging device, having a sequence of instructions which, when executed by a processor, causes said processor to execute a process including generating an image from signals received by the imaging device, deconvolving the image, and then extracting a desired pattern from the deconvolved image.

12 Claims, 4 Drawing Sheets

U.S. PATENT DOCUMENTS

| | | | |
|---|---|---|---|
| 6,468,218 | B1 | 10/2002 | Chen et al. |
| 6,542,626 | B1 | 4/2003 | Brouwer et al. |
| 6,579,239 | B1 | 6/2003 | Avinash et al. |
| 6,928,182 | B1 * | 8/2005 | Chui .......................... 382/131 |
| 7,263,214 | B2 * | 8/2007 | Uppaluri et al. ............. 382/128 |
| 2004/0184675 | A1 * | 9/2004 | Brown ........................ 382/279 |
| 2005/0220357 | A1 * | 10/2005 | Rifu ........................... 382/255 |
| 2005/0249416 | A1 * | 11/2005 | Leue et al. .................. 382/131 |
| 2006/0120608 | A1 * | 6/2006 | Luo et al. ................... 382/224 |

FOREIGN PATENT DOCUMENTS

| | | | |
|---|---|---|---|
| EP | 501907 | A2 * | 9/1992 |
| EP | 543626 | A1 * | 5/1993 |
| WO | WO 0185011 | A2 * | 11/2001 |

OTHER PUBLICATIONS

Shiying Hu et al., "Automatic Lung Segmentation for Accurate Quantitation of Volumetric X-Ray CT Images", Jun. 2001, IEEE Transactions on Medical Imaging, vol. 20, No. 6, pp. 490-498.*

Huang, D. et al., Optical Coherence Tomography, Science, vol. 254, p. 1178-181 (Nov. 22, 1991).

Gluhchev, G: "Contrast Enhancement of Portal Images With Adaptive Histogram Clip", Elektrik, Scientific and Technical Research Council of Turkey, Ankara, TR, vol. 5, No. 1, 1997, pp. 139-145.

Son Lam Phung et al: "A Novel Skin Color Model in YCBCR Color Space and Its Application to Human Face Detection", Proceedings 2002 International Conference on Image Processing. ICIP 2002. Rochester, NY, Sep. 22-25, 2002, International Conference on Image Processing, New York, NY.

* cited by examiner

PATTERN RECOGNITION SYSTEMS AND METHODS

FIELD OF THE INVENTION

The field of the invention relates to imaging systems, and more particularly to systems and methods for pattern recognition.

BACKGROUND OF THE INVENTION

A fundamental step in image interpretation is pattern recognition, which essentially involves the process of analyzing one or more pixels of a given image and assigning one or more pixels to one of a limited number of pre-defined categories, or classes, based on the value(s) of the one or more pixels. One or more of the pre-defined categories are the patterns, or features, to be recognized and extracted. As is known in the art, the algorithm to determine which category to assign a pixel of an image may be established by providing a generic computational procedure a large number of sample images for each category and having the computational procedure determine the characteristics for each category that are unique compared to the other categories, such as color or brightness.

The accuracy of this approach is dependent upon the effectiveness of the determined unique characteristics. For example, turning to FIG. 1a, an image is shown having a generally circular region 10 of gray points in the center of the image. In one pattern recognition system, it may be desirable to identify and locate this circular region 10 in the image. To develop such a system, small regions of pixels are evaluated throughout the picture. By evaluating the values and/or patterns of certain characteristics, such as brightness or color, of each pixel, or regions of pixels, and mapping or graphing the values, unique characteristics may become apparent. For example, turning to FIG. 1d, the brightness of each region of pixels is evaluated, and a mean value of brightness for each region of pixels is calculated along with a corresponding standard deviation and graphed according to its mean and standard deviation. From such a graphing, two groups become apparent, regions of pixels 14 associated with areas of the image within the circular region 10 and regions of pixels 16 associated with areas of the image outside the circular region 10. From this information, pre-defined categories may be established, and the pattern recognition algorithm may be configured to evaluate regions of pixels, assign them to the appropriate categories, and extract the desired patterns or features.

However, often times, imaging systems may introduce imperfections, such as blurring, into the images they produce, and thus, may generate images such as that shown in FIG. 1b instead of that shown in FIG. 1a. The desired pattern, shown in the circular region 10 of FIG. 1a, cannot be visually detected in FIG. 1b. A pattern recognition system that can detect a desired pattern from such an image would be desirable.

SUMMARY OF THE INVENTION

The invention is generally directed to imaging systems, and more particularly to systems and methods for pattern recognition. In one embodiment, a medical imaging system includes an imaging device and a computer-usable medium, electrically coupled to the imaging device, having a sequence of instructions which, when executed by a processor, causes said processor to execute a process including generating an image from signals received by the imaging device, deconvolving the image, and then extracting a desired pattern from the deconvolved image.

In another embodiment, a process for pattern recognition includes the steps of generating an image, deconvolving the image, and then extracting a desired pattern from the deconvolved image.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1e is a graph of a plurality of regions of pixels shown in FIG. 1a;

DETAILED DESCRIPTION OF THE PREFERRED EMBODIMENTS

Figure 2:
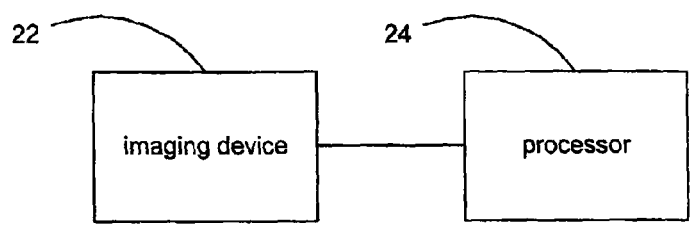
FIG. 2 is a diagram of a basic block diagram of a preferred embodiment of the invention.

Described below is a new pattern recognition method and system that extracts patterns or features from an image generated by an imaging system 20 comprising an imaging device 22 and a processor 24, as shown in FIG. 2. The imaging system 20 may be a medical imaging system and the imaging device 22 may be an ultrasound transducer or an apparatus for obtaining images using a light source, such as through optical coherence tomography (OCT). Image acquisition using OCT is described in Huang et al., "Optical Coherence Tomography," Science, 254, Nov. 22, 1991, pp 1178-1181, which is incorporated herein by reference. A type of OCT imaging device, called an optical coherence domain reflectometer (OCDR) is disclosed in Swanson U.S. Pat. No. 5,321,501, which is incorporated herein by reference. The OCDR is capable of electronically performing two- and three-dimensional image scans over an extended longitudinal or depth range with sharp focus and high resolution and sensitivity over the range.

Figure 1B:
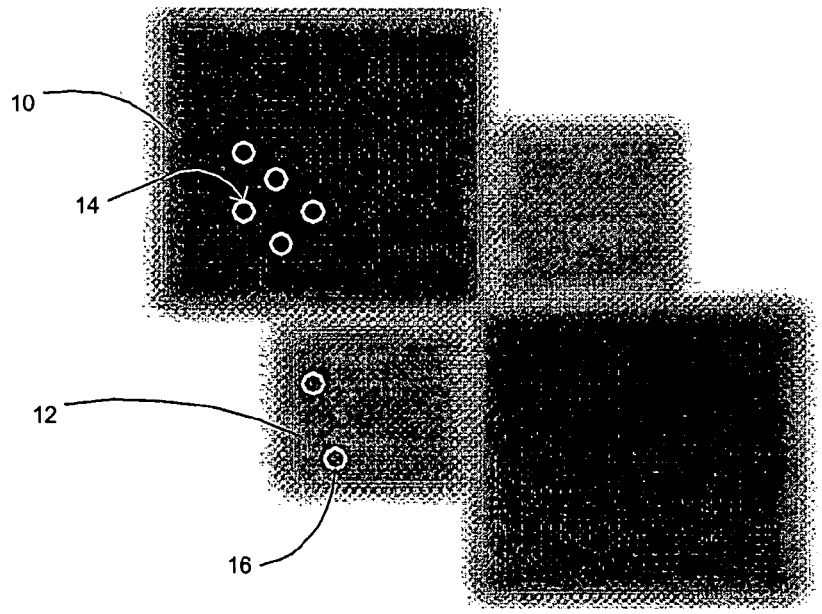
FIG. 1b is the image of FIG. 1a with blurring introduced into the image.
Figure 1A:
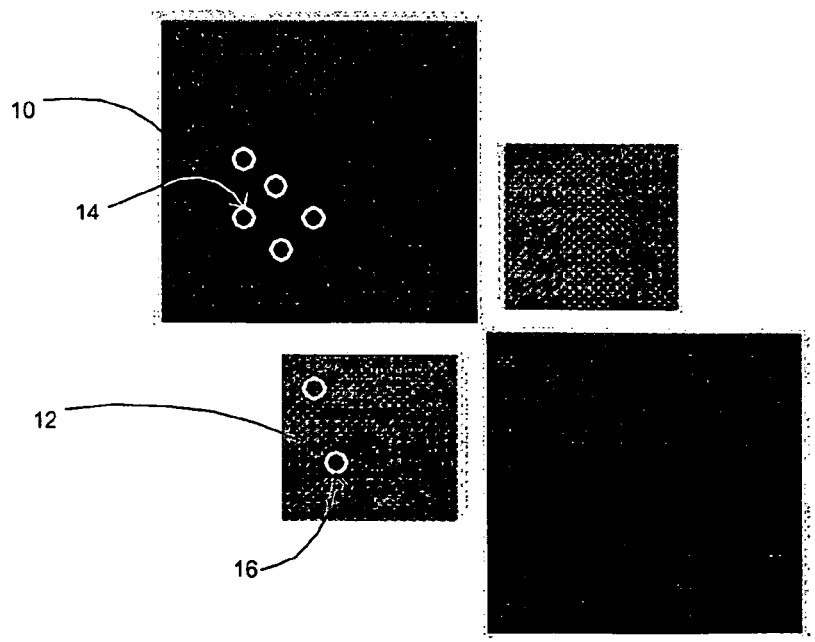
FIG. 1a is an image having a plurality of patterns or features to be extracted.
Figure 1C:
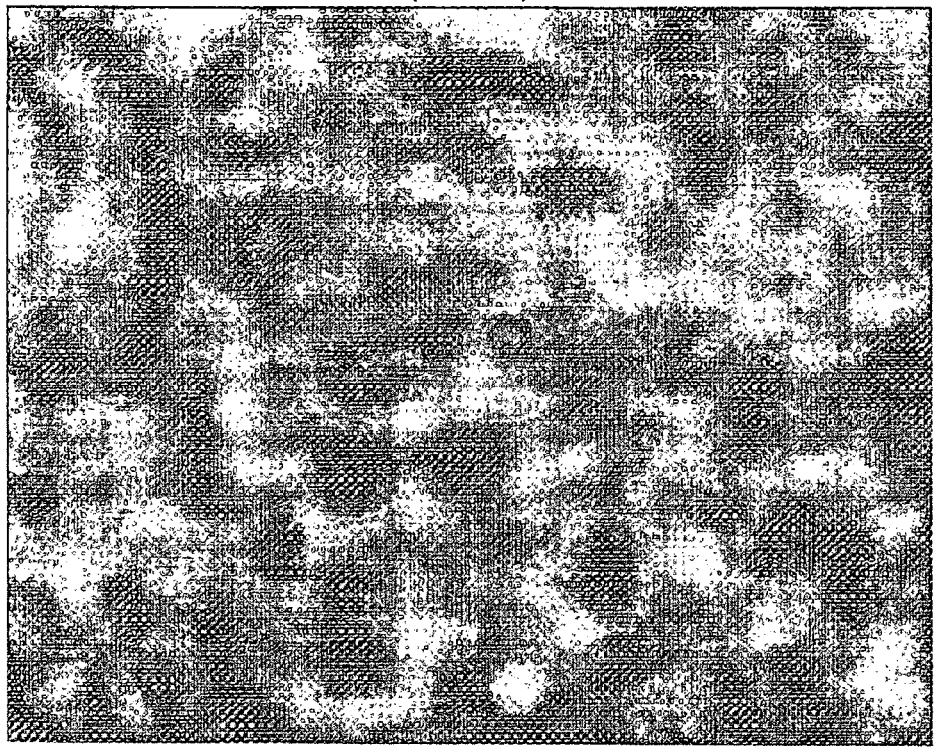
FIG. 1c shows an image with blurring.

As mentioned above, an imaging system 20 may introduce imperfections, such as blurring, into a generated image, as shown in FIG. 1c. One common approach to remove the imperfection is to computationally reverse the imperfection in the generated image. This is particularly effective when the imperfection is predictable or known. This approach is known in the art as deconvolution. In one method known in the art to create a deconvolution algorithm, an additional image of a single bright point source, such as a dot, is generated by the imaging system 20. When the imperfection is present in the image, an algorithm is created that reverses the blurred image to recreate the actual image with better precision.

Once this deconvolution algorithm is created, it may applied to all images created by the imaging system 20. To deconvolve such images, each image is represented as a plurality of points, preferably infinitesimal points, and the algorithm is applied to each individual point. One of ordinary skill in the art can appreciate that such an algorithm is effective only for limited types of imperfections, such as those created by a linear shifting variant system. There are many types of imperfections that may remain unaffected by deconvolution. Thus, as an example, for the image shown in FIG. 1c, a typical deconvolution system will produce the image shown in FIG. 1d, which shows slight improvement but still lacks the quality of the image shown in FIG. 1a. For instance, the desired pattern in the circular region 10 still cannot be visually detected in FIG. 1d. Such images are still disregarded as unhelpful.

Figure 1D:
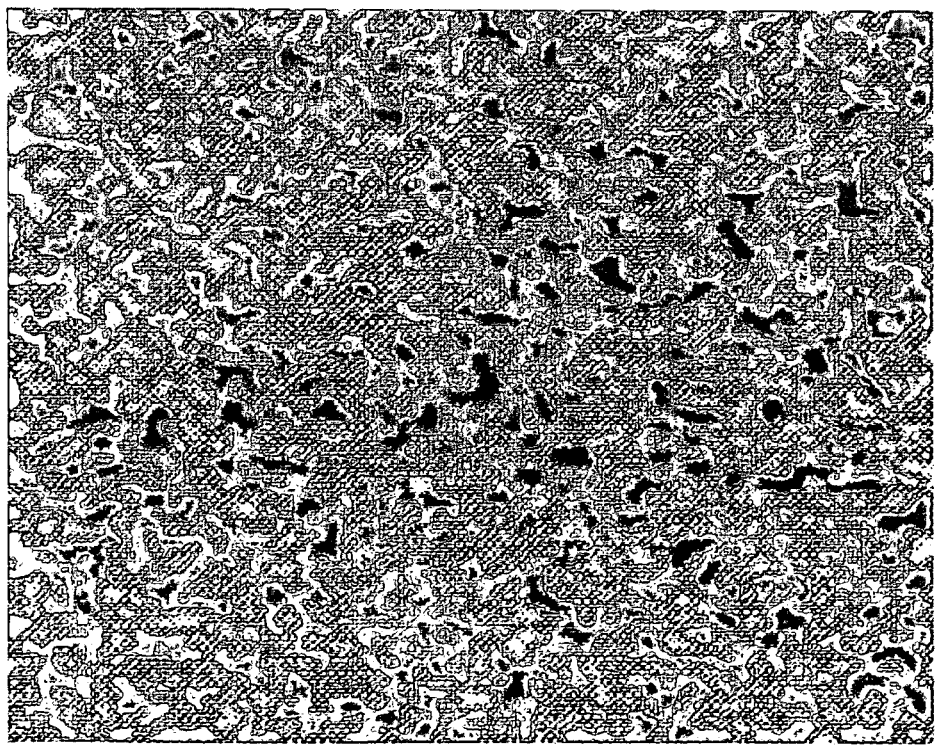
FIG. 1d is an image of FIG. 1c after a deconvolution algorithm as been applied.
Figure 1E:
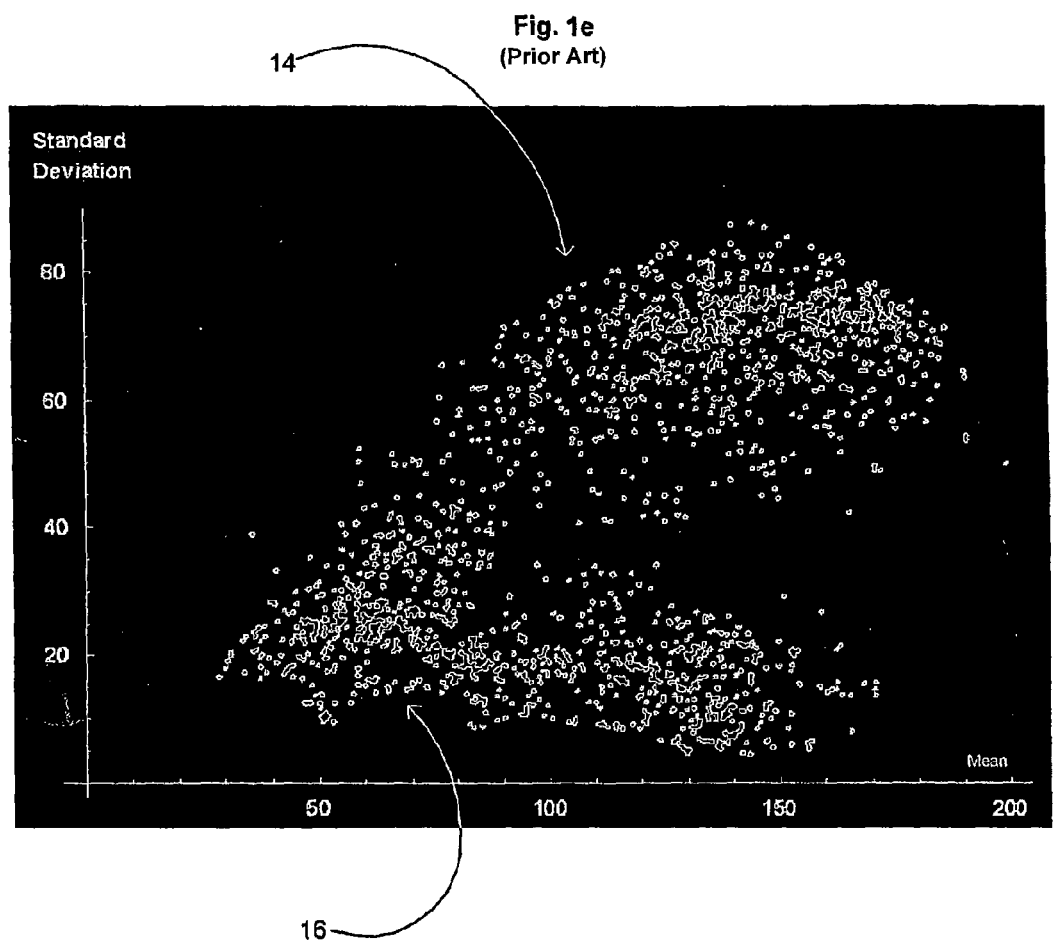

However, even though the image in FIG. 1d does not provide any visual help, there is still useful information that may be obtained from the deconvolution process. Turning back to FIG. 1e, small regions of pixels may be evaluated throughout the image in FIG. 1d. By evaluating the values and/or patterns of certain characteristics, such as brightness or color, of each pixel, or regions of pixels, and mapping or graphing the values, unique characteristics may still become apparent from the graph, even though they may not be visually apparent. For example, turning to FIG. 1e, the brightness of each region of pixels is evaluated, and a mean value of brightness for each region of pixels is calculated along with a corresponding standard deviation and graphed according to its mean and standard deviation. From such a graphing, two groups may become apparent, regions of pixels 14 associated with areas of the image within the circular region 10 and regions of pixels 16 associated with areas of the image outside the circular region 10. From this information, pre-defined categories may be established, and the pattern recognition algorithm may still be effective in extracting the desired patterns or features.

In other words, the deconvolution of an image may function as a contrast enhancer, which causes a better separation between categories. Accordingly, pattern recognition applied to such a deconvolved image may generate more accurate results.

Figure 3:
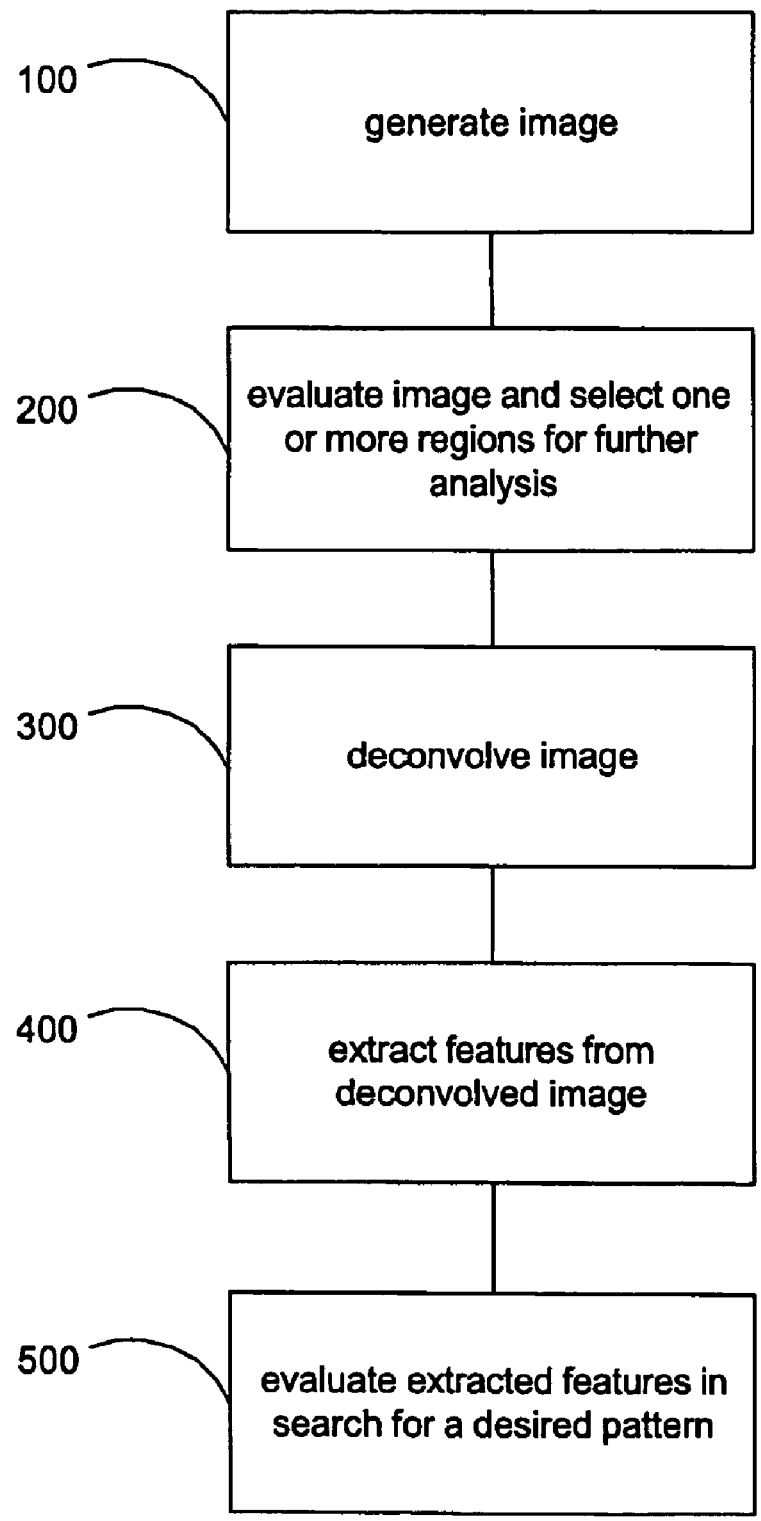
FIG. 3 is a diagram of a preferred embodiment of the invention.

Turning to FIG. 3, an example embodiment of a new pattern recognition method is shown as applied to an image generated by a processor 24 of an imaging system 20 based on data received by an imaging device 22, such as a medical imaging device, electrically coupled to the processor 24. After the image is generated (step 100), particular regions of interest may be selected and segmented for further analysis (step 200). Subsequently, the segmented image may be deconvolved (step 300), using any known deconvolution method. After the deconvolution (step 300), the pixels, or regions of pixels, of the image may be assigned to pre-defined categories, and then the desired feature(s) may be extracted (step 400) and further evaluated in search for a desired pattern (step 500).

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for applications involving medical imaging devices, but can be used on any design involving imaging devices in general. As a further example, each feature of one embodiment can be mixed and matched with other features shown in other embodiments. Additionally and obviously, features may be added or subtracted as desired. Accordingly, the invention is not to be restricted except in light of the attached claims and their equivalents.

What is claimed is:

1. A medical imaging system comprising:
   an ultrasound imaging device; and
   a computer-usable medium, electrically coupled to the ultrasound imaging device, having a sequence of instructions which, when executed by a processor, causes said processor to execute a process including generating an ultrasound image, comprising a plurality of pixels, from signals received by the ultrasound imaging device, deconvolving the ultrasound image, wherein the deconvolved ultrasound image includes a plurality of regions of pixels, evaluating the regions of pixels of the deconvolved ultrasound image by calculating a mean brightness and a standard deviation from the mean brightness for each region of pixels and plotting each region on a graph of mean brightness versus standard deviation from mean brightness, and assigning each region of pixels into one of a plurality of pre-defined categories based at least in part on a mean brightness of the pixels in the region using the graph.

2. The system of claim 1, said process further comprising determining imperfections in the ultrasound image caused by the medical imaging system.

3. The system of claim 2, wherein deconvolving the ultrasound image comprises the step of deconvolving the ultrasound image based on the determined imperfections.

4. The system of claim 1, wherein the ultrasound image includes a plurality of pixels and wherein said process further comprises evaluating the deconvolved ultrasound image and assigning the pixels into pre-defined categories based at least in part on the color of the pixel.

5. A method for pattern recognition comprising the steps of:
   generating an ultrasound image of an object using signals received by an ultrasound transducer, the ultrasound image comprising a plurality of pixels;
   deconvolving the ultrasound image, wherein the deconvolved ultrasound image includes a plurality of regions of pixels;
   evaluating the deconvolved ultrasound image by calculating a mean brightness and a standard deviation from the mean brightness for each region of pixels of the deconvolved ultrasound image and plotting each region on a graph of mean brightness versus standard deviation from mean brightness;

assigning at least one region of pixels into one of a plurality of pre-defined categories based at least in part on a mean brightness of the region using the graph; and displaying the deconvolved ultrasound image of the object indicating the assignment of the at least one region of pixels.

6. The method of claim 5, wherein the ultrasound image is generated by an ultrasound imaging system comprising the ultrasound transducer, the method further comprising the step of:

determining imperfections in the ultrasound image caused by the ultrasound imaging system.

7. The method of claim 6, wherein the step of deconvolving the ultrasound image comprises the step of deconvolving the ultrasound image based on the determined imperfections.

8. The method of claim 5, wherein the ultrasound image includes a plurality of pixels and wherein said process further comprises evaluating the deconvolved ultrasound image and assigning the pixels into pre-defined categories based at least in part on the color of the pixel.

9. A system for pattern recognition comprising:

means for generating an ultrasound image comprising a plurality of pixels;

means for deconvolving the ultrasound image, wherein the deconvolved ultrasound image includes a plurality of regions of pixels;

means for evaluating the deconvolved ultrasound image by calculating a mean brightness and standard deviation from the mean brightness and plotting each region on a graph of mean brightness versus standard deviation from mean brightness; and means for assigning each region of pixels into one of a plurality of pre-defined categories based at least in part on a mean brightness of the region based on the graph.

10. The system of claim 9, wherein the ultrasound image is generated by an ultrasound imaging system comprising an ultrasound transducer, the system further comprising:

a means for determining imperfections in the ultrasound image caused by the ultrasound imaging system.

11. The system of claim 9, wherein the means for deconvolving the ultrasound image comprises a means for deconvolving the ultrasound image based on the determined imperfections.

12. The system of claim 9, wherein the ultrasound image includes a plurality of pixels and wherein the system further comprises a means for assigning the pixels into pre-defined categories based at least in part on the color of the pixels.

* * * * *